United States Patent Office 3,755,586
Patented Aug. 28, 1973

3,755,586
ANTI-TUSSIVE COMPOSITIONS CONTAINING PIPERIDINE DERIVATIVES
Neil P. Sanzari, Parsippany, and Jane F. Emele, Morris Plains, N.J., assignors to Warner-Lambert Company, Morris Plains, N.J.
No Drawing. Continuation-in-part of abandoned application Ser. No. 816,069, Apr. 14, 1969. This application Mar. 25, 1971, Ser. No. 128,118
Int. Cl. A61k 27/00
U.S. Cl. 424—267         8 Claims

ABSTRACT OF THE DISCLOSURE

An anti-tussive composition containing per dosage unit from about 0.5 to 30 mg. of a piperidine derivative of the formula:

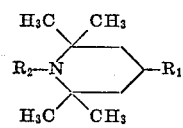

wherein $R_1$ is amino or

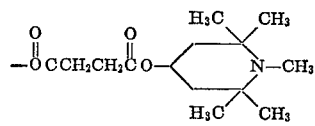

or

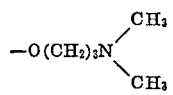

$R_2$ is methyl or

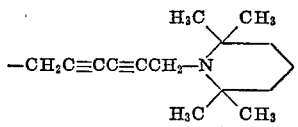

and the corresponding pharmaceutically acceptable acid addition salts or quaternary ammonium salts thereof. The composition is administered, preferably orally, at about 0.05 to about 2.5 mg./kg. of body weight.

---

This application is a continuation-in-part of our copending application No. 816,069 filed Apr. 14, 1969 now abandoned.

The present invention relates to compositions of matter; and more particularly, the present invention relates to anti-tussive compositions containing per dosage unit from about 0.5 to 30 mg. of a piperidine derivative of the formula:

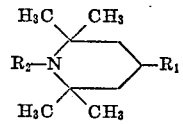

wherein $R_1$ is amino or

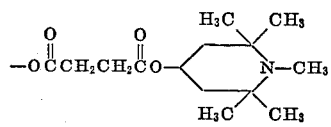

or

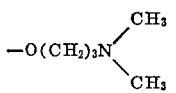

$R_2$ is methyl or

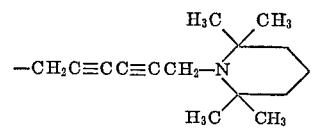

and the corresponding pharmaceutically acceptable acid addition salts or quaternary ammonium salts thereof.

Among the piperidine derivatives and the pharmaceutically acceptable acid addition salts which are useful in the present compositions are:

1,2,2,6,6-pentamethyl-4-(N-tosyl-L-α-glutamylamino) piperidine
Bis[1,2,2,6,6-pentamethyl-4-piperidyl]succinate Bis[hydrogen sulfate]
4-(3-dimethylaminopropoxy)-1,2,2,6,6-pentamethyl piperidine
1,6-bis(2,2,6,6-tetramethyl-piperidino)-2,4-hexadiyne
4-amino-1,2,2,6,6-pentamethylpiperidine.

There are many anti-tussive compositions which are available to the clinician for the symptomatic relief of coughs, the most popular compositions invariably contain either dextro-methorphan or its hydrobromide salt or codeine or its sulfate salt as the active ingredient. However, these compounds possess many side effects which make them objectionable as anti-tussive agents. Codeine, for example, being a narcotic, not only possesses the usual addiction liability, but is also known to cause constipation. On the other hand, although dextro-methorphan is not a narcotic, it is much less potent than codeine on a mg. to mg. basis. In addition, it has an objectionable bitter taste which renders it difficult to be administered orally, as for example, in pediatric dosage forms. Furthermore, the known anti-tussives do not have a rapid onset of action and they suffer from a further drawback in that the duration of the activity in the body is quite fleeting. Consequently, repetitive administration is imperative to provide the necessary therapeutic level of the substance in the blood stream.

We have now found new compositions of matter containing those piperidine derivatives as described above which are non-narcotic, but more active than either codeine or dextromethorphan. Additionally, these piperidine derivatives are less toxic and possess no objectionable taste.

Although these compounds are known compounds, their use as anti-tussives is entirely unexpected since they have been previously described as being ganglionic blocking agents.

The oral $LD_{50}$ of these compounds in mice is extremely low as exemplified in the table below:

| | $LD_{50}$ (mg./kg.) |
|---|---|
| 4-(3-dimethylaminopropoxy)-1,2,2,6,6-pentamethyl-piperidine | 860 |
| 1,2,2,6,6-pentamethyl-4-(N-tosyl-L-α-glutamylamino)piperidine | >1000 |
| Bis[1,2,2,6,6-pentamethyl-4-piperidyl]succinate-bis[hydrogen sulfate] | >3000 |
| 1,6-bis(2,2,6,6-tetramethylpiperidino)-2,4-hexadiyne | >2000 |
| d-Methorphan HBr | 205 |

From the above tabulation, it is readily apparent that compositions containing these piperidine derivatives are far less toxic than dextro-methorphan hydrobromide.

The anti-tussive activity of the compositions of this invention are avaluated by inducing cough in anesthetized cats by intravenous administration of dimethylphenylpiperizinium iodide (DMPP). The methodology of this test will be disclosed more fully below.

Generally speaking, the compositions of this invention are more potent than codeine or dextra-methorphan. For example, a composition containing 4-(3-dimethylaminopropoxy)-1,2,2,6,6-pentamethylpiperidine has an $ED_{50}$ of 0.057 mg./kg., whereas codeine has a relative activity of 80.7 and dextromethorphan has a relative activity of 30.7, when tested in accordance with the DMPP method. Relative activity is derived from a comparison of the $ED_{50}$ of each compound on an equal weight basis, as described in the following experimental procedure.

The preparation of these compounds is fully described in Lutz et al., Journal of Organic Chem. 27: 1695 (1962). 1,6-bis(2,2,6,6-tetramethylpiperidino) - 2,4 - hexadiyne is further described in U.S. Pat. No. 3,085,093; 1,2,2,6,6-pentamethyl - 4 -(N - tosyl - L - α - glutamylamino)piperidine, 4-amino-1,2,2,6,6-pentamethylpiperidine in Orthner, Ann. Chem., 456, 252; and bis[1,2,2,6,6-pentamethyl-4-piperidyl]succinate bis[hydrogen sulfate] in U.S. Pat. No. 3,120,540.

The compositions of this invention are preferably formulated for oral use. They comprise the stated active ingredients and such standard pharmaceutical excipients such as lactose, dicalcium phosphate, which are commonly used in the oral formulations for human and veterinary medicine. These oral compositions are, for example, tablets, pills, dispersible powders, granules, troches, lozenges, and semisolid and liquid formulations, for instance, pharmaceutically acceptable syrups, solutions and dispersions either for administration per se or after confinement in some suitable way, for example, encapsulated. Generally speaking, the compositions are formulated in such a way so as to provide about 0.5 to 30 mg., preferably 1 to 5 mg. per dosage unit.

The compositions of this invention may optionally contain other known therapeutic agents, for example, antitussives, anti-bacterial agents, expectorants, local anesthetics, nasal decongestants, antacids, anti-pyretics, analgesics, and antihistamines. These anti-bacterial agents include, for example, the bacitracin derivatives. The known anti-histamines include, for example, chlorpheniramine maleate, phenylpropanolamine HCl, phenyl toloxamine citrate. The expectorants include, for example, glycerol guiacolate and ammonium chloride and the like. The anti-pyretics include, for example, aminoparaamino phenol, whereas the analgesics include, for example, acetyl salicylic acid.

To make these compositions more palatable, they may also optionally contain flavoring agents such as saccharin or other flavoring agents well known to the pharmacist's art. They may also contain preservatives such as preservatives to prolong and enhance their shelf life.

Although the free bases and the pharmaceutically acceptable or quaternary ammonium salts of these bases as disclosed in the aforesaid publications can be used in the instant pharmaceutical composition, salts, particularly those formed with sulfuric acid, hydrochloric acid and pyroglyamic acid, are preferred.

The following examples are included in order further to illustrate the invention.

EXAMPLE I

Healthy, adult cats of either sex were anesthetized with alpha-chloralose in propylene glycol (80 mg./kg. i.p.). Carotid blood pressure was recorded employing a Statham transducer and Offner Dynograph. Respiratory movement was monitored pneumographically. The saphenous vein was catheterized for drug administration.

The compound to be tested was administered in the following manner:

(1) Challenging doses of DMPP, 50 γ/kg. i.v., were given before and at various time intervals up to 3 hours after the single intravenous administration of the test compound. Onset, peak activity and duration of action were derived from the time-course curve. Activity was determined in the terms of percent cough suppression.

(2) DMPP, 50 γ/kg. i.v., was given before and at the derived peak time of effect after the i.v. administration of sequential increments of each compound. A log dose-response curve was constructed in terms of the percent cough suppression. An effective dose 50($ED_{50}$) was determined by interpolation.

The results obtained are tabulated below:

| Compound | $ED_{50}$, (mg./kg.) | R.A.: d-methorphan | R.A.: codeine |
|---|---|---|---|
| d-Methorphan HBr | 1.75 | 1.0 | 2.6 |
| 4-(3-Dimethylaminopropoxy)-1,2,2,6,6-pentamethylpiperidine | 0.057 | 30.7 | 80.7 |
| 1,2,2,6,6-pentamethyl-4-(N-tosyl-L-α-glutamylamino)piperidine | 0.065 | 26.9 | 70.7 |
| 4-amino-1,2,2,6,6-pentamethylpiperidine | 0.15 | 11.7 | 30.7 |
| Bis[1,2,2,6,6-pentamethyl-4-piperidyl]succinate bis[hydrogen sulfate] | 2.30 | 0.76 | 2.0 |
| 1,6-bis(2,2,6,6-tetramethylpiperidino)-2,4-hexadiyne | 0.26 | 6.7 | 17.5 |

In the above, R.A. stands for relative anti-tussive activity. Each piperidine $ED_{50}$ was compared to that of d-methorphan to obtain relative activity; e.g. 1.75/.057=R. A. of 30.7. The higher the ratio, the more active is the composition.

EXAMPLE II

A mixture of 1 part by weight of 4-(3-dimethylaminopropoxy)-1,2,2,6,6-pentamethylpiperidine with 99 parts by weight of spray dried lactose are blended together; they are then compressed into tablets weighing about 100 mg., each tablet contains 1 mg. of the active ingredient.

EXAMPLE III

A mixture of 1 part by weight of 1,2,2,6,6-pentamethyl-4-(N-tosyl-L-α-glutamylamino)piperidine with 99 parts by weight of spray dried lactose are blended together; they are then compressed into tablets weighing about 100 mg., each tablet contains 1 mg. of the active ingredient.

EXAMPLE IV

A mixture of 1 part by weight of 4-amino-1,2,2,6,6-pentamethylpiperidine with 99 parts by weight of spray dried lactose are blended together; they are then compressed into tablets weighing about 100 mg., each tablet contains 1 mg. of the active ingredient.

EXAMPLE V

A mixture of 1 part by weight of bis[1,2,2,6,6-pentamethyl-4-piperidyl]succinate bis[hydrogen sulfate] with 99 parts by weight of spray dried lactose are blended together; they are then compressed into tablets weighing about 100 mg., each tablet contains 1 mg. of the active ingredient.

EXAMPLE VI

A mixture of 1 part by weight of 1,6-bis(2,2,6,6-tetramethylpiperidino)-2,4-hexadiyne with 99 parts by weight of spray dried lactose are blended together; they are then compressed into tablets weighing about 100 mg., each tablet contains 1 mg. of the active ingredient.

What we claim is:

1. A method for suppressing coughs in a mammal afflicted with cough which comprises the administration to said mammal of an anti-tussively effective amount of a member selected from the group consisting of a compound of the formula:

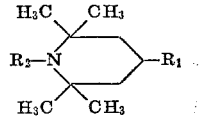

wherein $R_1$ is a member selected from the group consisting of amino, and 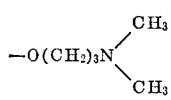

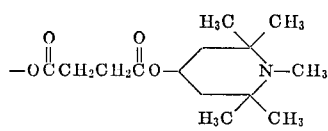

and $R_2$ is a member selected from the group consisting of methyl and

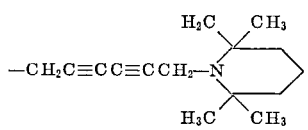

its pharmaceutically acceptable acid addition salt, and its quaternary ammonium salt in an inert pharmaceutical carrier.

2. The method according to claim 1 wherein said compound is 4 - (3 - dimethylaminopropoxy)-1,2,2,6,6-pentamethylpiperidine.

3. The method according to claim 1 wherein said compound is 4-amino-1,2,2,6,6-pentamethylpiperidine.

4. A method according to claim 1 wherein said compound is 1,6-bis(2,2,6,6-tetramethylpiperidino)-2,4-hexadiyne.

5. The method according to claim 1 wherein said composition is orally administered.

6. The method according to claim 1 wherein said compound is bis[1,2,2,6,6 - pentamethyl-4-piperidyl]succinate bis[hydrogen sulfate].

7. A method for suppressing coughs in a mammal afflicted with cough which comprises the administration to said mammal of an anti-tussively effective amount of 1,2,2,6,6-pentamethyl-4-(N-tosyl - L - α - glutamylamino) piperidine acid in an inert pharmaceutical carrier.

8. The method according to claim 7 wherein said composition is orally administered.

References Cited
UNITED STATES PATENTS

| 3,085,093 | 4/1963 | Meltzer et al. | 260—293 |
| 3,120,540 | 2/1964 | Meltzer et al. | 260—294.3 |

OTHER REFERENCES

Lutz et al.: Journal of Organic chem. 27, 1695–1703 (1962).

Orthner: Ann. Chem., 456; pp. 225–252 (1927).

STANLEY J. FRIEDMAN, Primary Examiner

A. J. ROBINSON, Assistant Examiner